(12) United States Patent
Matsui

(10) Patent No.: US 10,605,616 B2
(45) Date of Patent: Mar. 31, 2020

(54) IMAGE REPRODUCING DEVICE, IMAGE REPRODUCING SYSTEM, AND IMAGE REPRODUCING METHOD

(71) Applicant: DENSO TEN Limited, Kobe-shi, Hyogo (JP)

(72) Inventor: Machiko Matsui, Kobe (JP)

(73) Assignee: DENSO TEN Limited, Kobe-shi (JP)

( * ) Notice: Subject to any disclaimer, the term of this patent is extended or adjusted under 35 U.S.C. 154(b) by 0 days.

(21) Appl. No.: 15/909,331

(22) Filed: Mar. 1, 2018

(65) Prior Publication Data

US 2018/0313658 A1 Nov. 1, 2018

(30) Foreign Application Priority Data

Apr. 26, 2017 (JP) .................. 2017-086938

(51) Int. Cl.
| | |
|---|---|
| *G01C 21/36* | (2006.01) |
| *G08G 1/04* | (2006.01) |
| *B60R 1/00* | (2006.01) |
| *H04N 13/117* | (2018.01) |
| *H04N 13/189* | (2018.01) |
| *G08G 1/0962* | (2006.01) |
| *G06K 9/00* | (2006.01) |
| *H04N 13/243* | (2018.01) |
| *G06F 3/0481* | (2013.01) |

(52) U.S. Cl.
CPC .............. *G01C 21/367* (2013.01); *B60R 1/00* (2013.01); *G01C 21/3647* (2013.01); *G01C 21/3676* (2013.01); *G06K 9/00671* (2013.01); *G06K 9/00791* (2013.01); *G08G 1/04* (2013.01); *G08G 1/0962* (2013.01); *H04N 13/117* (2018.05); *H04N 13/189* (2018.05); *H04N 13/243* (2018.05); *B60R 2300/207* (2013.01); *B60R 2300/602* (2013.01); *B60R 2300/605* (2013.01); *G06F 3/04815* (2013.01)

(58) Field of Classification Search
CPC ............. G01C 21/367; G01C 21/3667; H04N 13/111; H04N 13/117; B60R 11/04; B60R 2300/105; B60R 2300/102; B60R 2300/302

See application file for complete search history.

(56) References Cited

U.S. PATENT DOCUMENTS

| | | | | |
|---|---|---|---|---|
| 2002/0175999 A1* | 11/2002 | Mutobe | ..................... | B60R 1/00 348/148 |
| 2010/0110194 A1* | 5/2010 | Euler | ..................... | B60R 1/00 348/149 |
| 2010/0182432 A1* | 7/2010 | Augst | ..................... | B60R 1/00 348/148 |

(Continued)

FOREIGN PATENT DOCUMENTS

| | | | | |
|---|---|---|---|---|
| EP | 1462762 A1 * | 9/2004 | ............. | G06T 15/20 |
| JP | 2012-091625 A | 5/2012 | | |
| JP | 2013-236374 A | 11/2013 | | |

*Primary Examiner* — Robert J Hance
(74) *Attorney, Agent, or Firm* — Oliff PLC

(57) ABSTRACT

There is provided an image reproducing device having an acquiring unit, a converting unit, a generating unit, and a display control unit. If an index is selected by a user's operation, the generating unit generates a virtual viewpoint image according to a virtual viewpoint direction corresponding to the selected index, as a reproduction image.

10 Claims, 8 Drawing Sheets

(56) References Cited

U.S. PATENT DOCUMENTS

| | | | |
|---|---|---|---|
| 2013/0033602 A1* | 2/2013 | Quast | B60R 1/00 348/148 |
| 2013/0293683 A1* | 11/2013 | Zhou | H04N 5/23238 348/47 |
| 2013/0322634 A1* | 12/2013 | Bennett | G10L 21/00 381/17 |
| 2015/0319370 A1* | 11/2015 | Wang | B60R 1/00 348/148 |
| 2016/0063333 A1* | 3/2016 | Kakita | G06T 3/40 382/104 |
| 2016/0094807 A1* | 3/2016 | Fujio | H04N 7/183 348/148 |
| 2017/0195564 A1* | 7/2017 | Appia | H04N 5/23238 |
| 2017/0358056 A1* | 12/2017 | Higuchi | G06T 1/00 |
| 2018/0308275 A1* | 10/2018 | Fortmann | G06K 9/00791 |

* cited by examiner

IMAGE REPRODUCING DEVICE, IMAGE REPRODUCING SYSTEM, AND IMAGE REPRODUCING METHOD

CROSS-REFERENCE TO RELATED APPLICATIONS

This application is based on and claims priority under 35 USC 119 from Japanese Patent Application No. 2017-86938 filed on Apr. 26, 2017.

BACKGROUND

The present disclosure relates to a technology for reproducing images.

In the related art, drive recorders are used for various purposes such as investigations of causes of traffic accidents and transportation business operator's monitoring on whether drivers drive safely.

General drive recorders are roughly classified into three types, i.e. a type to record images acquired by a front camera configured to image the zone in front of a vehicle, a type to record images acquired by a front camera configured to image the zone in front of a vehicle and images acquired by an in-vehicle camera configured to image the inside of the vehicle, and a type to record images acquired by a front camera configured to image the zone in front of a vehicle and images acquired by a back camera configured to image the zone behind the vehicle.

Meanwhile, bird's-eye view images which are generated on the basis of images acquired by cameras configured to image the surroundings of a vehicle are used for parking assistance and driving assistance (see Patent Document 1 for instance). For example, if a drive recorder records images necessary to generate bird's-eye view images, when data saved in the drive recorder is reproduced, it is possible to convert reproduction images into bird's-eye view images.

[Patent Document 1] Japanese Patent Application Laid-Open No. 2012-91625

However, when data saved in the drive recorder is reproduced, even if an image selecting means disclosed in Patent Document 1 is simply applied, it is impossible to select a viewpoint position for bird's-eye view images. Therefore, it is impossible to obtain bird's-eye view images according to a user's desired viewpoint position by the relation with imaging locations.

SUMMARY

It is therefore an object of the present disclosure to provide an image reproducing technology capable of easily selecting images according to a virtual viewpoint which is a user's desired viewpoint position by the relation with imaging locations.

An image reproducing device according to an aspect of the present disclosure has a configuration including: an acquiring unit configured to acquire images acquired by imaging the surroundings of a vehicle during running of the vehicle with cameras, and information on the imaging location of the images; a converting unit configured to convert the images into projection images by projecting the images onto a virtual projection plane; a generating unit configured to generate a virtual viewpoint image according to a virtual viewpoint on the basis of the projection images; and a display control unit configured to control a display device such that the display device displays a map image including a vehicle location mark representing the imaging location and displays indexes for selecting a virtual viewpoint direction for a virtual viewpoint image in the vicinity of the vehicle location mark, wherein if an index is selected by a user's operation, the generating unit generates a virtual viewpoint image according to a virtual viewpoint direction corresponding to the selected index, as a reproduction image.

In the image reproducing device, the generating unit may generate virtual viewpoint images viewed from different virtual viewpoints, and the image reproducing device may further include a selecting unit configured to select the virtual viewpoint image according to the virtual viewpoint direction corresponding to the index selected by the user's operation, as the reproduction image.

In the image reproducing device, the virtual projection plane may include a curved plane.

In the image reproducing device, the display control unit may control the display device such that the display device displays the indexes on the vehicle location mark, and in the case where an index superimposed on the vehicle location mark may be selected by user's operation, virtual viewpoint images according to a virtual viewpoint direction seen from just above the vehicle, as reproduction images.

In the image reproducing device, the display control unit may perform control such that the indexes is displayed on the reproduction image.

In the image reproducing device, the display control unit may perform control such that indexes corresponding to virtual viewpoint directions seen from the outside of the vehicle and indexes corresponding to virtual viewpoint directions seen from the inside of the vehicle are displayed in the vicinity of the vehicle location mark.

In the image reproducing device, the display control unit may perform control such that indexes corresponding to virtual viewpoint directions seen at a first depression angle and indexes corresponding to virtual viewpoint directions seen at a second depression angle different from the first depression angle are displayed in the vicinity of the vehicle location mark.

An image reproducing system according to an aspect of the present disclosure has a configuration including: a recording device configured to record images acquired by imaging the surroundings of a vehicle during running of the vehicle with cameras, and information on the imaging locations of the acquired images; and the image reproducing device for outputting reproduction images based on the images recorded by the recording device.

An image reproducing method according to an aspect of the present disclosure has a configuration including: an acquiring step of acquiring images acquired by imaging the surroundings of a vehicle during running of the vehicle with cameras, and information on the imaging location of the images; a converting step of converting the images into projection images by projecting the images onto a virtual projection plane; a generating step of generating a virtual viewpoint image according to a virtual viewpoint on the basis of the projection images; and a display control step of controlling a display device such that the display device displays a map image including a vehicle location mark representing the imaging location and displays indexes for selecting a virtual viewpoint direction for a virtual viewpoint image in the vicinity of the vehicle location mark, wherein if an index is selected by a user's operation, the generating step generates a virtual viewpoint image according to a virtual viewpoint direction corresponding to the selected index, as a reproduction image.

In the image reproducing method, the method further including: generating virtual viewpoint images viewed from different virtual viewpoints; and selecting the virtual viewpoint image according to the virtual viewpoint direction corresponding to the index selected by the user's operation, as the reproduction image.

According to an aspect of the embodiments of the present invention, it is possible to provide an image reproducing technology capable of easily selecting images according to a virtual viewpoint which is a user's desired viewpoint position by the relation with imaging locations.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described in detail with reference to the accompanying drawings.

<1. Configuration of Drive Recorder>

Figure 1:
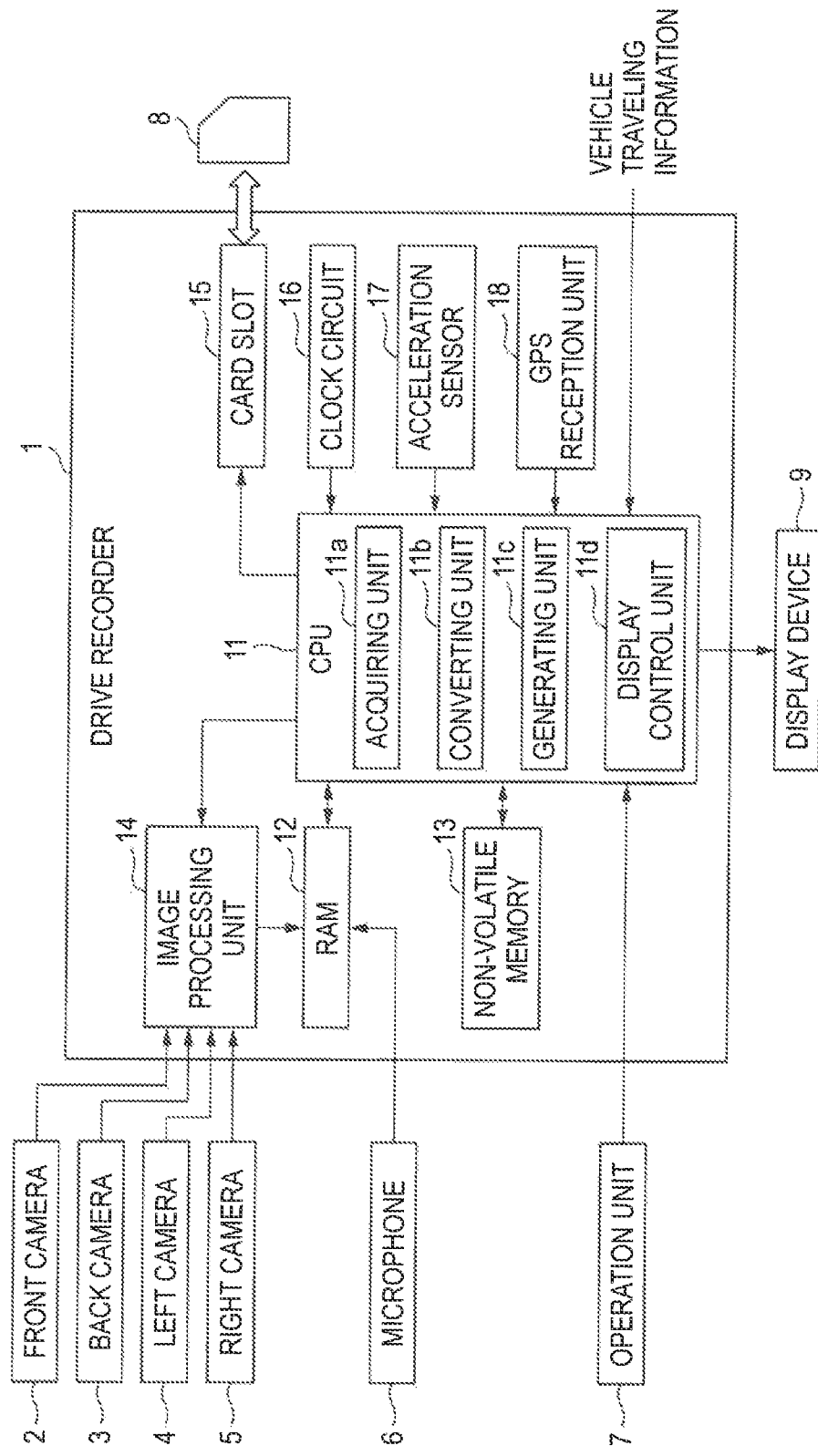
FIG. 1 is a view illustrating an example of the configuration of a drive recorder.

FIG. 1 is a view illustrating an example of the configuration of a drive recorder 1. The drive recorder 1 is an example of an image reproducing system according to the present invention. The drive recorder 1 is mounted on a vehicle. Hereinafter, the vehicle having the drive recorder 1 mounted thereon will also be referred to simply as the vehicle.

The drive recorder 1 acquires images acquired by imaging the surroundings of the vehicle with four vehicle-mounted cameras (a front camera 2, a back camera 3, a left camera 4, and a right camera 5) mounted on the vehicle.

Figure 2:
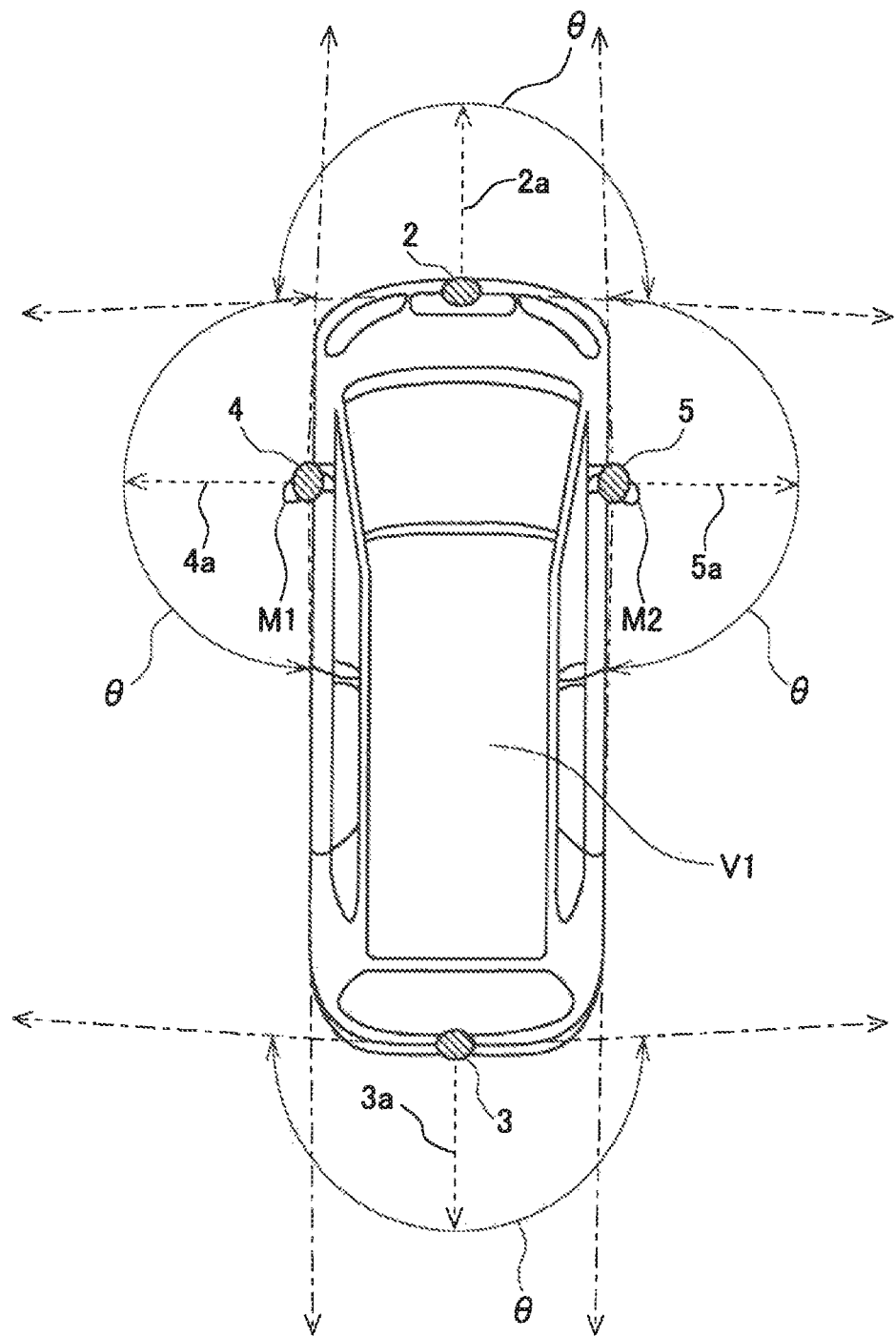
FIG. 2 is a view illustrating positions where four vehicle-mounted cameras are disposed on a vehicle.

FIG. 2 is a view illustrating positions where the four vehicle-mounted cameras (the front camera 2, the back camera 3, the left camera 4, and the right camera 5) are disposed on a vehicle V1.

The front camera 2 is installed at the front end of the vehicle V1. The optical axis 2a of the front camera 2 is aligned in the front-rear direction of the vehicle V1 as seen in a plan view from above. The front camera 2 images the zone in front of the vehicle V1. The back camera 3 is installed at the rear end of the vehicle V1. The optical axis 3a of the back camera 3 is aligned in the front-rear direction of the vehicle V1 as seen in a plan view from above. The back camera 3 images the zone behind the vehicle V1. It is preferable to mount the front camera 2 and the back camera 3 at the center in the left-right direction of the vehicle V1; however, they may be mounted at positions slightly deviating in the left-right direction from the center in the left-right direction.

The left camera 4 is installed on a left door mirror M1 of the vehicle V1. The optical axis 4a of the left camera 4 is aligned in the left-right direction of the vehicle V1 as seen in a plan view from above. The left camera 4 images the zone on the left side of the vehicle V1. The right camera 5 is installed on a right door mirror M2 of the vehicle V1. The optical axis 5a of the right camera 5 is aligned in the left-right direction of the vehicle V1 as seen in a plan view from above. The right camera 5 images the zone on the right side of the vehicle V1. However, in the case where the vehicle V1 is a so-called vehicle without door mirrors, the left camera 4 is attached in the vicinity of the rotating shaft (a hinge part) of the left door, not via a door mirror, and the right camera 5 is attached in the vicinity of the rotating shaft (a hinge part) of the right door, not via a door mirror.

The angle of view of each vehicle-mounted camera in the horizontal direction is 180 degrees or more. Therefore, it is possible to image the entire periphery of the vehicle V1 in the horizontal direction with the four vehicle-mounted cameras (the front camera 2, the back camera 3, the left camera 4, and the right camera 5). In the present embodiment, the number of vehicle-mounted cameras is four; however, the number of vehicle-mounted cameras is not limited to four, and needs only to be two or more. As an example, in the case where the angle θ of view of each vehicle-mounted camera in the horizontal image is relatively wide, a virtual viewpoint image may be generated on the basis of three images acquired from three cameras less than four. As another example, in the case where the angle θ of view of each vehicle-mounted camera in the horizontal image is relatively narrow, a virtual viewpoint image may be generated on the basis of five images acquired from five cameras more than four.

Referring to FIG. 1 again, the recording scheme of the drive recorder 1 may be, for example, a full-time recording scheme for regularly recording information on the driving state including images acquired by the vehicle-mounted cameras in a memory card 8, or may be an event recording scheme for recording images acquired by the vehicle-mounted cameras and information on the driving state including event contents other than images in the memory card 8 if an event such as overshooting from a white line (lane departure), sudden braking, or a collision is detected.

The drive recorder 1 includes a microcomputer as a control unit for controlling the whole of the drive recorder. Specifically, the radar device 1 includes a CPU 11 configured to realize various control functions by performing computing processes, a RAM 12 usable as a work area for computing processes, and a non-volatile memory 13 for storing a variety of data. The non-volatile memory 13 is configured with, for example, a hard disk or a flash memory. The non-volatile memory 13 is for storing programs which are firmware, setting parameters, and so on. The non-volatile memory 13 retains map information which is information including road information of the whole country or a certain wide region. The CPU 11 implements the function of controlling the individual units of the drive recorder 1 by performing computing processes according to programs stored in the non-volatile memory 13 in advance.

To the drive recorder 1, the four vehicle-mounted cameras (the front camera 2, the back camera 3, the left camera 4, and the right camera 5) and a microphone 6 are connected. The four vehicle-mounted cameras (the front camera 2, the back camera 3, the left camera 4, and the right camera 5) and the microphone 6 may be included in the drive recorder 1. Each vehicle-mounted camera includes a lens and imaging elements, and can electronically acquire image data. An example of disposition of the individual vehicle-mounted cameras is as described above. The microphone 6 is disposed, for example, on a main body part of the drive recorder 1 or at an appropriate position on the vehicle. The microphone 6 collects sounds around the vehicle and acquires sound data. The number and disposition of microphones 6 may be appropriately changed. For example, a microphone for vehicle exterior sounds to mainly collect sounds generated outside the vehicle, and a microphone for vehicle interior sounds to mainly collect sounds generated by a driver may be provided.

The drive recorder 1 includes an image processing unit 14 configured to process image data acquired by the four vehicle-mounted cameras (the front camera 2, the back camera 3, the left camera 4, and the right camera 5). In the present embodiment, the image processing unit 14 is a hardware circuit. The image processing unit 14 performs predetermined image processing on signals on image data input from the four vehicle-mounted cameras (the front camera 2, the back camera 3, the left camera 4, and the right camera 5), thereby generating digital image data having a predetermined format. In the predetermined image processing, for example, A/D conversion, luminance correction, contrast correction, and so on can be included. The predetermined format may be, for example, a JPEG format or the like. Image data subjected to processing of the image processing unit 14 is stored in the RAM 12.

A part of the storage area of the RAM 12 can be used as a ring buffer. In this ring buffer, image data processed by the image processing unit 14, and sound data acquired by the microphone 6 are always stored in association with information such as imaging times and imaging locations. In the ring buffer, if data is stored up to the last area, new data is stored from the first area. In other words, in the ring buffer, the oldest data is sequentially overwritten with new data. Therefore, the RAM 12 always retains image data and sound data corresponding to a certain length of time in the past.

The drive recorder 1 is connected to an operation unit 7 for receiving instructions from the driver or the like. The operation unit 7 may be included in the drive recorder 1. The operation unit 7 is disposed at an appropriate position on the vehicle. As the operation unit 7, for example, a touch panel, mechanical buttons, and so on can be used. However, the operation unit 7 may be configured integrally with a display device 9 to be described below. Also, the operation unit 7 may include a microphone, and receive instructions from the driver or the like by recognizing voice uttered by the driver or the like. Also, the drive recorder 1 includes a card slot 15, a clock circuit 16, an acceleration sensor 17, and a GPS (Global Positioning System) reception unit 18.

The card slot 15 is configured such that the memory card 8 can be inserted and removed. Also, instead of the memory card 8, other recording media such as a hard disk drive, an optical disk, a magneto-optical disk, and a flexible disk may be used.

A variety of data such as image data and sound data stored in the ring buffer of the RAM 12 is regularly recorded in the memory card 8 inserted in the card slot 15 according to instructions of the CPU 11.

The clock circuit 16 generates a signal corresponding to the current time, and outputs the signal to the CPU 11.

The acceleration sensor 17 detects acceleration representing the magnitude of impact applied to the vehicle, in units of the acceleration due to gravity (G). The detected acceleration is an instantaneous value of acceleration at that moment, and has a magnitude, for example, in a direction according to 3 axes or 2 axes perpendicular to each other. The acceleration sensor 17 outputs a signal corresponding to such acceleration to the CPU 11.

The GPS reception unit 18 receives signals from GPS satellites, and acquires the vehicle location which is the location of the vehicle at that moment. The GPS reception unit 18 acquires location information expressed by longitude and latitude on the earth, as the vehicle location, and outputs the location information to the CPU 11. By the way, the GPS reception unit 18 can detect the accurate time on the basis of signals from GPS satellites. Therefore, the GPS reception unit 18 may be used in place of the clock circuit 16. Also, the GPS reception unit 18 may be used to correct the time of the clock circuit 16.

Also, the CPU 11 is connected to the display device 9. The display device 9 is disposed at an appropriate position on the vehicle. As the display device 9, for example, a liquid crystal display, an organic EL (Electro Luminescence) display, a head-up display configured to project images onto front glass, and the like can be used.

<2. Image Reproducing Function of Drive Recorder>

The CPU 11 performs computing processes according to programs stored in the non-volatile memory 13 in advance, thereby becoming a configuration having an acquiring unit 11a, a converting unit 11b, a generating unit 11c, and a display control unit 11d.

The acquiring unit 11a acquires images and information on imaging locations stored in the memory card 8.

The converting unit 11b projects images acquired by the acquiring unit 11a onto a virtual projection plane, thereby converting the corresponding images into projection images. Specifically, the converting unit 11b projects images acquired by the front camera 2 onto a first area R1 of a virtual projection plane 100 in a virtual three-dimensional space shown in FIG. 3, thereby converting the images acquired by the front camera 2 into first projection images. Similarly, the converting unit 11b projects images acquired by the back camera 3, images acquired by the left camera 4, and images acquired by the right camera 5 onto second to fourth areas R2 to R4 of the virtual projection plane 100 shown in FIG. 3, respectively, thereby converting the images acquired by the back camera 3, the images acquired by the left camera 4, and the images acquired by the right camera 5 into second to fourth projection images, respectively.

Figure 3:
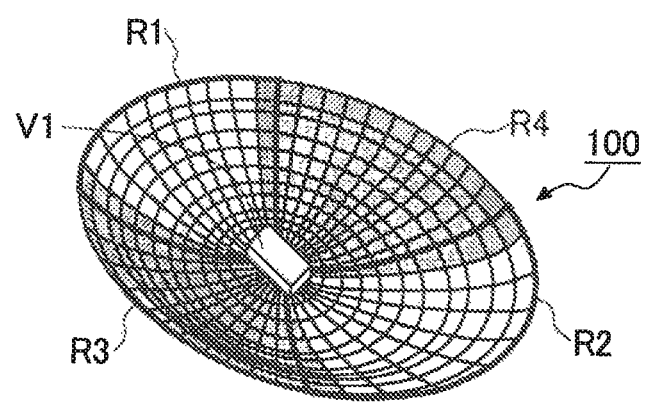
FIG. 3 is a view illustrating an example of a virtual projection plane.

The virtual projection plane 100 shown in FIG. 3 has, for example, a substantially hemispherical shape (a bowl shape). The central part of the virtual projection plane 100 (the bottom part of the bowl) is defined as the location of the vehicle V1. Since the virtual projection plane 100 is configured to include a curved plane as described above, it is possible to reduce distortion of images of objects existing away from the vehicle V1. Therefore, it is possible to check the scenery to a long distance from virtual viewpoint images. As a result, for example, investigations of accidents and near misses, checking of entrances and exits of parking lots and the shapes of interchanges, and so on become easy. Also, each of the first to fourth areas R1 to R4 has parts overlapping other neighboring areas. Since these overlapping parts are provided, it is possible to prevent images of objects projected onto the boundary parts between the areas from disappearing from projection images.

The generating unit 11e generates virtual viewpoint images according to virtual viewpoints, on the basis of projection images. Specifically, the generating unit 11e receives data on first to fourth projection images from the converting unit 11b, and virtually attaches the first to fourth projection images to the first to fourth areas R1 to R4 of the virtual projection plane 100.

Also, the generating unit 11c virtually creates a polygon model representing the three-dimensional shape of the vehicle V1. In the virtual three-dimensional space where the virtual projection plane 100 is set, the model of the vehicle V1 is disposed at the position defined as the location of the vehicle V1 (at the central part of the virtual projection plane 100) such that the first area R1 and the fourth area R4 are formed on the front side and rear side of the model, respectively.

Further, the generating unit 11c sets a virtual viewpoint in the virtual three-dimensional space where the virtual projection plane 100 is set. The virtual viewpoint is defined by a viewpoint position and a view direction. As long as at least a part of the virtual projection plane 100 comes into view, the viewpoint position and view direction of the virtual viewpoint can be set to an arbitrary viewpoint position and an arbitrary view direction.

The generating unit 11c virtually clips a necessary area of the virtual projection plane 100 (an area visible from the virtual viewpoint), according to the set virtual viewpoint. Then, the generating unit 11c performs rendering on the polygon model according to the set virtual viewpoint, thereby generating a rendering image of the vehicle V1. Subsequently, the generating unit 11c superimposes the rendering image of the vehicle V1 on the clipped image, thereby generating a virtual viewpoint image according to the virtual viewpoint. Also, the generating unit 11c generates virtual viewpoint images according to virtual viewpoint directions corresponding to indexes selected by an operation of the driver or the like on the operation unit 7, as reproduction images. The indexes will be described in detail below.

The display control unit 11d controls the display device 9 such that the display device displays a map image including a vehicle location mark representing the imaging location and displays indexes for selecting virtual viewpoint directions for virtual viewpoint images, in the vicinity of the vehicle location mark. Also, the display control unit 11d controls the display device 9 such that the display unit displays reproduction images.

Figure 4:
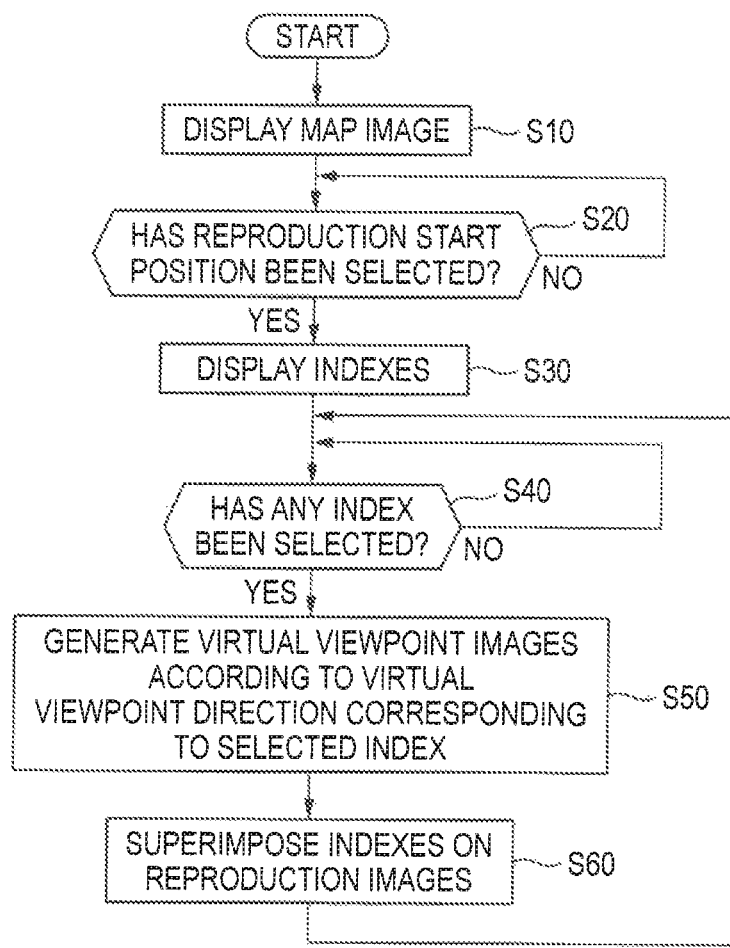
FIG. 4 is a flow chart illustrating an example of an image reproducing operation of the drive recorder.

FIG. 4 is a flow chart illustrating an example of an image reproducing operation of the drive recorder 1. If the driver or the like performs a predetermined operation on the operation unit 7, the flow operation shown in FIG. 4 is started.

Figure 5:
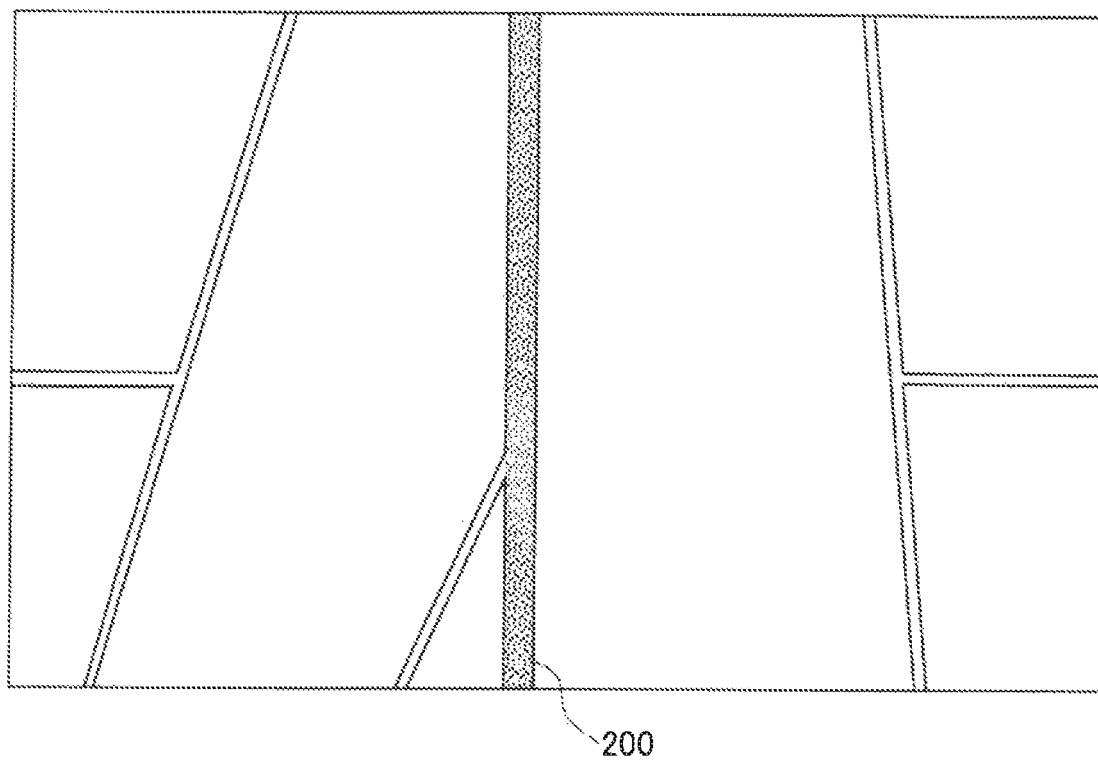
FIG. 5 is a view illustrating an example of a map image.

First, the display control unit 11d controls the display device 9 such that the display device displays a map image including, for example, a travel history route 200 as shown in FIG. 5, using the map information stored in the non-volatile memory 13 and the driving state stored in the memory card 8 (STEP S10).

Figure 6:
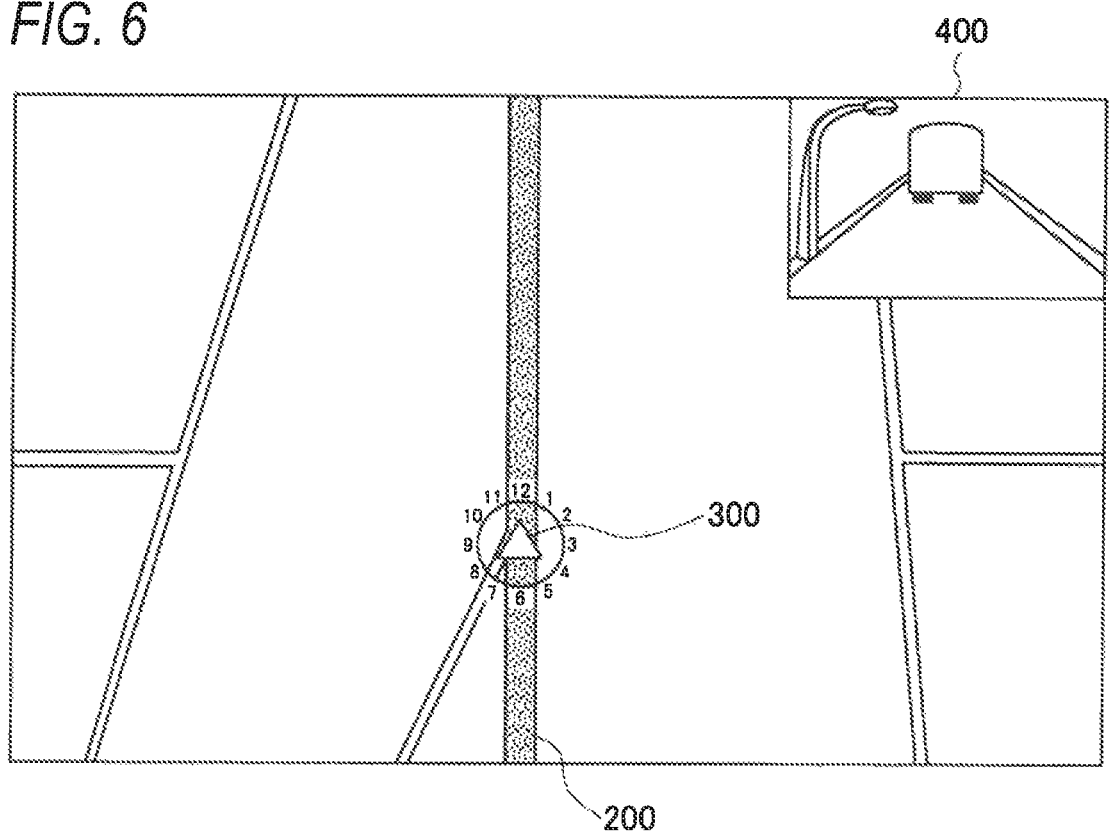
FIG. 6 is a view illustrating another example of the map image.

Subsequently, the CPU 11 determines whether a reproduction start position has been selected (STEP S20). In the case where the driver or the like has performed an operation to designate a certain position in the travel history route 200, on the operation unit 7, the CPU 11 sets the designated position as a reproduction start position. Subsequently, the display control unit 11d controls the display device such that the display device displays a vehicle location mark 300 at the reproduction start position, for example, as shown in FIG. 6, and displays indexes "1" to "12" for selecting virtual viewpoint directions for virtual viewpoint images in the vicinity of the vehicle location mark 300. Also, in the example shown in FIG. 6, the display device displays an image 400 acquired by imaging an imaging location corresponding to the vehicle location mark 300 with the front camera 2, on the upper right side of the display screen; however, the display device may not display the image 400. Also, in the present embodiment, as the notation of the indexes, numbers are used; however, other notations such as the alphabet may be used. Also, the number of indexes is not limited to 12, and needs only to be two or more.

Figure 7:
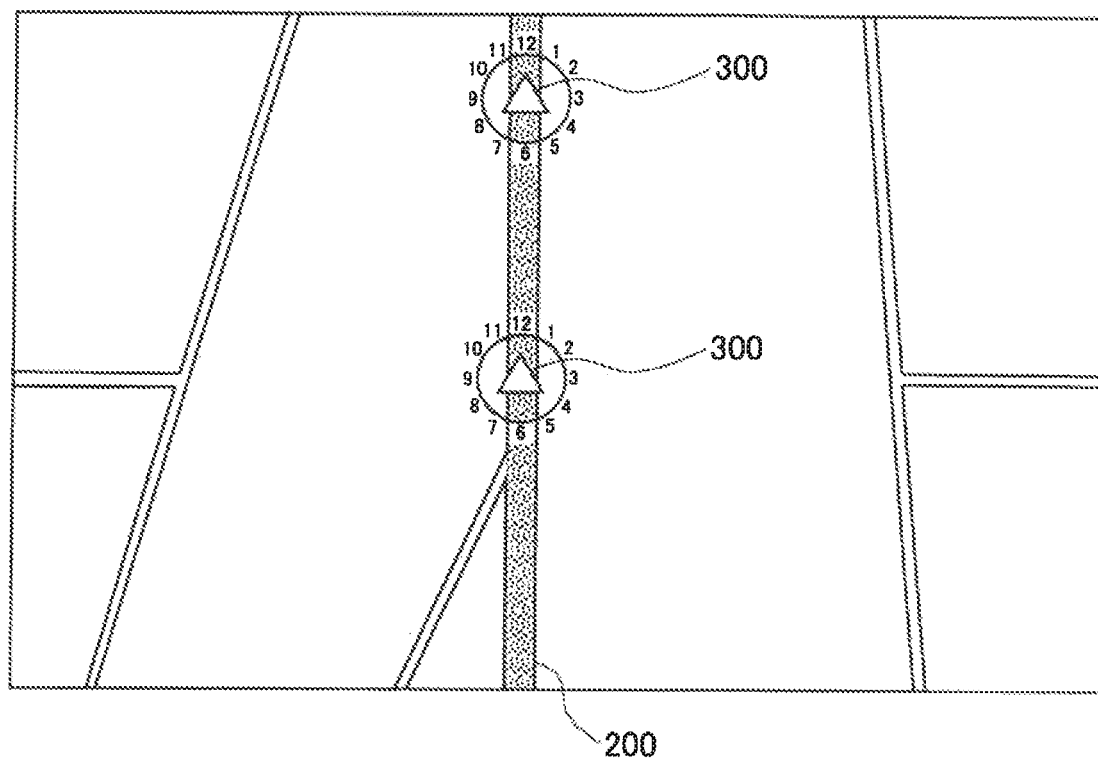
FIG. 7 is a view illustrating a further example of the map image.

In the case where the recording scheme of the drive recorder 1 is the event recording scheme, since imaging locations are discretely distributed, in STEP S10, the display control unit may control the display device such that the display device displays a map image including vehicle location marks 300 and indexes at individual imaging locations, for example, as shown in FIG. 7, and STEPS S20 and S30 may be omitted, and in STEP S40 (to be described below), the CPU may determine whether a reproduction start position and an index have been selected.

In STEP S40 following STEP S30, the CPU 11 determines whether any index has been selected. If an index is selected, the selection of the corresponding index is kept until an operation of selecting any other index is performed. As examples of the index selection operation, a selection operation using a touch panel, a selection operation using an up/down key installed on the steering or the front panel in the vehicle, and so on can be taken.

In the case where an index has been selected, the generating unit 11c generates a virtual viewpoint image according to a virtual viewpoint direction corresponding to the selected index, as a reproduction image (STEP S50). In this way, it is possible to select a virtual viewpoint direction for a virtual viewpoint image at an imaging location corresponding to a vehicle location mark 300 included in the map image by selecting an index displayed in the vicinity of the vehicle location mark 300. Therefore, it is possible to easily select virtual viewpoint images according to a desired viewpoint position of the driver or the like by the relation with imaging locations.

Subsequently, the display control unit 11d controls the display device such that the display device displays the indexes "1" to "12" for selecting the virtual viewpoint directions for virtual viewpoint images on the reproduction image generated by the generating unit 11c (STEP S60). If the process of STEP S60 finishes, the procedure returns to STEP S40, and the flow operation is continued.

Figure 8:
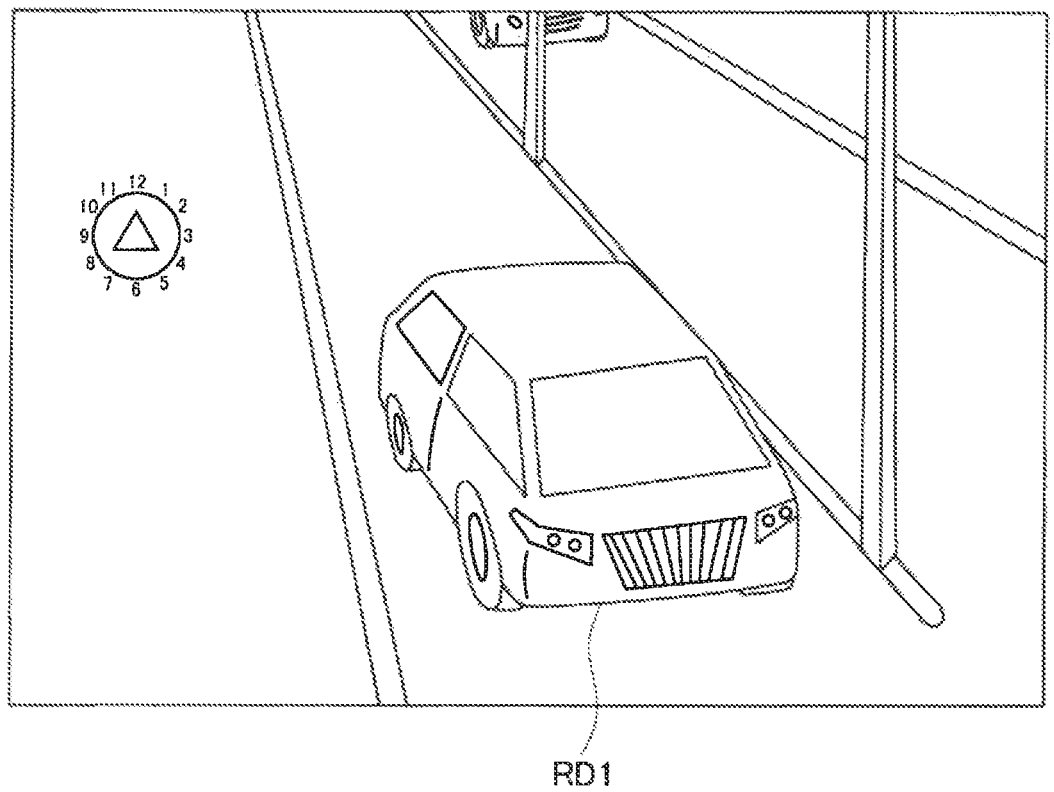
FIG. 8 is a view illustrating an example of a reproduction image with indexes superimposed thereon.

For example, in the case where the index "1" has been selected on the map image shown in FIG. 6, the display screen of the display device 9 is switched from the map image shown in FIG. 6 to a reproduction image shown in FIG. 8. The reproduction image shown in FIG. 8 is a virtual viewpoint image according to the virtual viewpoint direction corresponding to the index "1", i.e. a virtual viewpoint image like a bird's-eye view from above on the right side in front of the vehicle. Also, the virtual viewpoint image includes a rendering image RD1 of the vehicle.

In the example shown in FIG. 8, since the indexes "1" to "12" for selecting the virtual viewpoint directions for virtual viewpoint images is displayed on the reproduction image generated by the generating unit Ile, it is possible to change the selected virtual viewpoint direction to another direction, without returning from the reproduction image shown in FIG. 8 to the map image shown in FIG. 6. Therefore, operability related to change of a selected virtual viewpoint direction to another direction improves.

Figure 9:
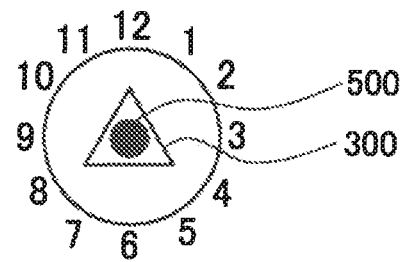
FIG. 9 is a view illustrating a modification of the indexes.

In index display of STEPS S30 and S60 described above, for example, as shown in FIG. 9, the display control unit 11d may control the display device 9 such that the display device displays a mark 500 on the vehicle location mark 300, and if the mark 500 superimposed on the vehicle location mark 300 is selected, a virtual viewpoint image according to a virtual viewpoint direction seen from just above the vehicle may be determined as a reproduction image. Therefore, it becomes easy to select the virtual viewpoint direction seen from just above the vehicle. Also, the vehicle location mark 300 and the mark 500 may be unified, such that if the vehicle location mark 300 is selected, the virtual viewpoint direction seen from just above the vehicle is selected.

Figure 10:
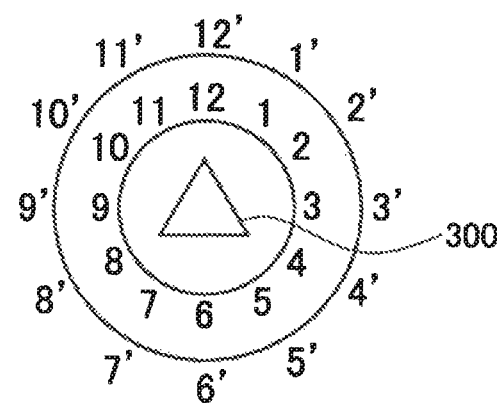
FIG. 10 is a view illustrating another modification of the indexes.

Also, in index display of STEPS S30 and S60 described above, for example, as shown in FIG. 10, indexes "1" to "12" corresponding to virtual viewpoint directions seen from the outside of the vehicle, and indexes "1'" to "12'" corresponding to virtual viewpoint directions seen from the inside of the vehicle may be displayed in the vicinity of the vehicle location mark 300. In this case, it becomes easy to select not only the virtual viewpoint directions seen from the outside of the vehicle but also the virtual viewpoint directions seen from the inside of the vehicle. For example, in the case where the index "1'" has been selected, a virtual viewpoint image of the left side behind the vehicle which the driver of the vehicle can see through the vehicle is displayed. In such a virtual viewpoint image, a transparent or translucent rendering image of the vehicle is displayed. Also, instead of displaying the indexes "1'" to "12'", switching between the virtual viewpoint directions seen from the outside of the vehicle and the virtual viewpoint directions seen from the inside of the vehicle may be performed by a selection operation using an up/down key installed on the steering or the front panel in the vehicle.

Figure 11:
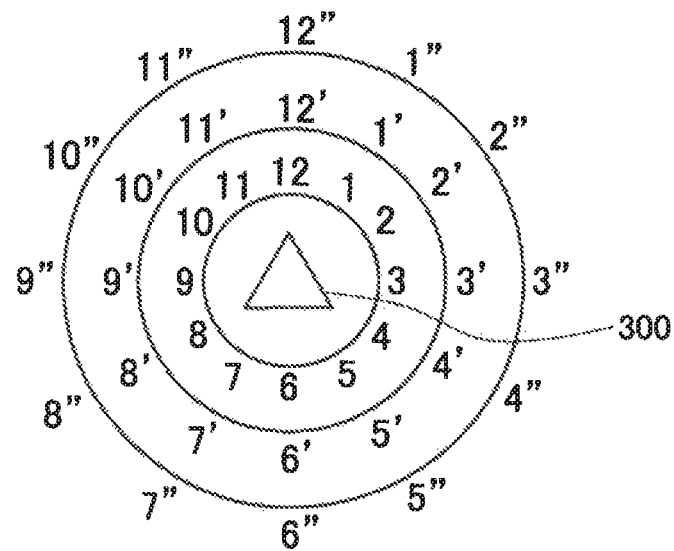
FIG. 11 is a view illustrating a further modification of the indexes.

Also, in index display of STEPS S30 and S60 described above, for example, as shown in FIG. 11, indexes "1" to "12" corresponding to virtual viewpoint directions seen at a first depression angle, indexes "1'" to "12'" corresponding to virtual viewpoint directions seen at a second depression angle different from the first depression angle, and indexes "1''" to "12''" corresponding to virtual viewpoint directions seen at a third depression angle different from the first depression angle and the second depression angle may be displayed in the vicinity of the vehicle location mark 300. In this case, it becomes easy to select a virtual viewpoint image from a desired depression angle of the driver or the like by the relation with the imaging location. However, instead of displaying the indexes "1'" to "12'" and the indexes "1''" to "12''", switching of the depression angles may be performed by a selection operation using an up/down key installed on the steering or the front panel in the vehicle. Also, the number of switchable depression angle stages is not limited to three, and may be two, or four or more.

<3. Modifications>

It should be understood that the embodiment described above are in every aspect illustrative and not restrictive, and that the technical scope of the present invention is defined not by the description of the embodiment given above but by the appended claims, and encompasses any modifications and variations made within the sense and scope equivalent to those of the claims. The various modifications described in the above-described embodiment can be appropriately combined as long as they do not contradict each other.

For example, in the embodiment described above, the virtual projection plane 100 includes the curved plane; however, a flat plane may be created as a virtual projection plane. Also, in the embodiment described above, the generating unit 11e generates not only virtual viewpoint images of the scenery seen from the outside of the vehicle but also virtual viewpoint images of the scenery seen from the inside of the vehicle; however, the generating unit may generate only virtual viewpoint images of the scenery seen from the outside of the vehicle.

Also, the same functions as the acquiring unit 11a, the converting unit 11b, the generating unit 11c, and the display control unit 11d of the CPU 11 of the drive recorder 1 described above may be provided to a device other than the drive recorder 1 (for example, a personal computer) such that the device other than the drive recorder 1 outputs reproduction images based on images recorded in the memory card 8.

Also, a vehicle interior imaging camera for imaging the interior of the vehicle may be mounted on the vehicle and images acquired by the vehicle interior imaging camera may be recorded in the memory card 8 such that it is possible to select images acquired by the vehicle interior imaging camera as reproduction images.

For example, in the embodiment described above, the indexes are used to select the virtual viewpoint directions for virtual viewpoint images based on images stored in the memory card 8; however, the same indexes may be used to select the virtual viewpoint directions even when the display device displays virtual viewpoint images in real time during running of the vehicle for the purpose of driving assistance or the like. In other words, the display device may display a map image including a vehicle location mark representing the location of the vehicle running, and display indexes for selecting virtual viewpoint directions for virtual viewpoint images, in the vicinity of the vehicle location mark.

Figure 12A:
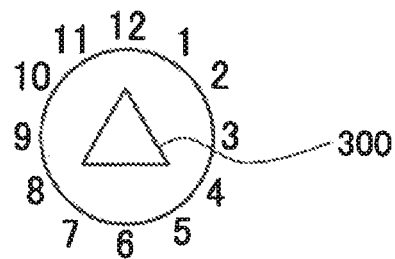
FIGS. 12A and 12B are views illustrating still further modifications of the indexes.
Figure 12B:
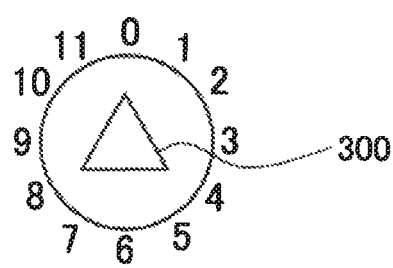

Also, as display of a map image including a vehicle location mark representing the location of the vehicle running, there are head-up display in which the traveling direction of the vehicle is always at the top, and north-up display in which the north is displayed on at the top. Since the map image shown in FIG. 6 is also north-up display, in the case where a map image including a vehicle location mark representing the location of the vehicle running is displayed in the north-up display form, similarly to the map image shown in FIG. 6, as shown in FIG. 12A, a number "12" may be assigned to the traveling direction of the vehicle; whereas in the case where a map image including a vehicle location mark representing the location of the vehicle running is displayed in the head-up display form, unlike the map image shown in FIG. 6, for example, as shown in FIG. 12B, a number "0" may be assigned to the traveling direction of the vehicle. In this case, it is possible to easily prevent head-up display and north-up display from being confused when the indexes are checked.

Also, in the case where display of a map image including a vehicle location mark representing the location of the vehicle running is switchable between normal display (planar display) and skyview display (bird's eye display), for example, in the normal display, a disk which is displayed in the vicinity of indexes may have a perfect circle shape, and in the skyview display, a disk which is displayed in the vicinity of indexes may have an imperfect circle shape.

Figure 13:
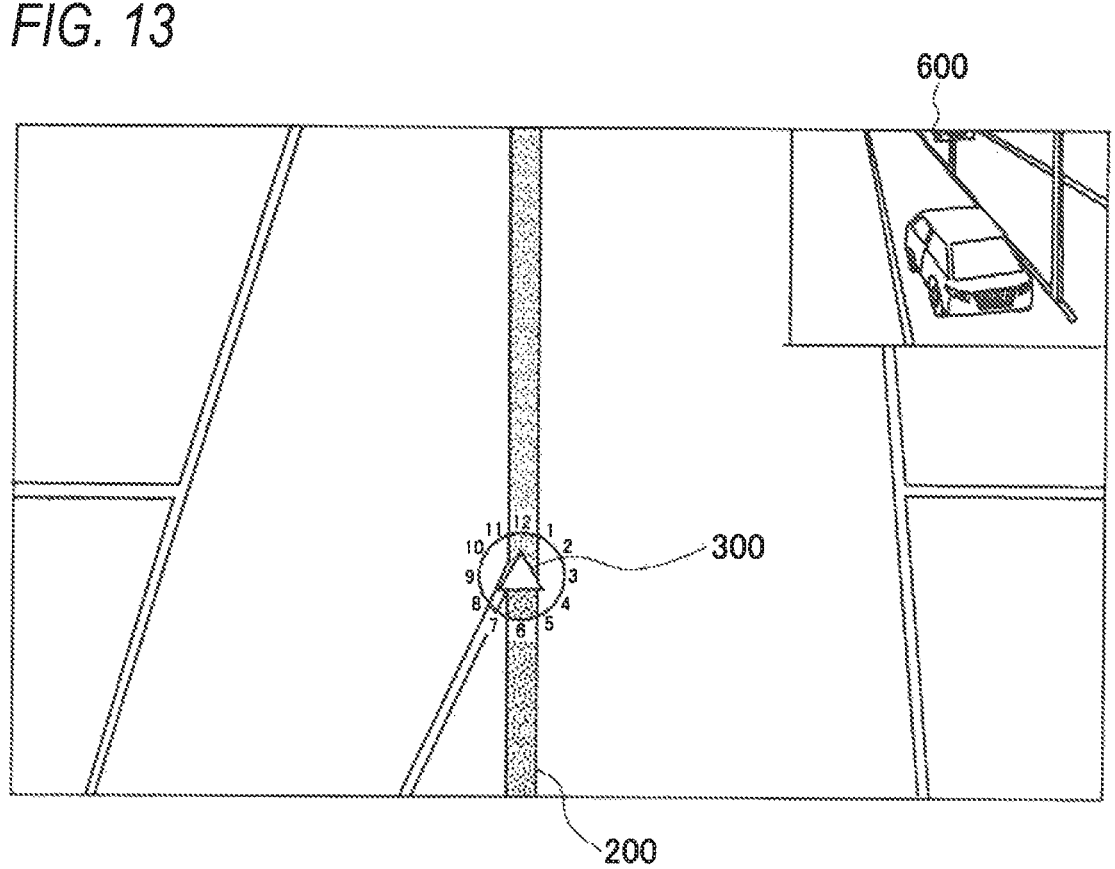
FIG. 13 is a view illustrating another example of the reproduction image.

For example, in the embodiment described above, as shown in FIG. 8, each reproduction image is displayed on the entire screen; however, as shown in FIG. 13, a virtual viewpoint image 600 which is a reproduction image may be displayed in a Picture-in-Picture (PinP) form. In this case, in STEP S60, even if switching from the display shown in FIG. 6 to the display shown in FIG. 13 is performed, the display of the map image having the indexes for selecting the virtual viewpoint directions for virtual viewpoint images is maintained. Even in the display shown in FIG. 13, similarly to the display shown in FIG. 8, since the indexes for selecting the virtual viewpoint directions for virtual viewpoint images is displayed, it is possible to change a selected virtual viewpoint direction to another direction without returning from the display shown in FIG. 13 to the display shown in FIG. 6.

For example, in the embodiment described above, after an index is selected by an operation of the driver or the like on the operation unit 7, virtual viewpoint images according to the selected index are generated; however, before an index is selected by an operation of the driver or the like on the operation unit 7, virtual viewpoint images according to virtual viewpoint directions may be generated and stored in the memory card 8 such that if the driver or the like selects an index by operating the operation unit 7, virtual viewpoint images according to the selected index are selected as reproduction images. In this configuration, although a memory card 8 having larger recording capacity is required as compared to the embodiment described above, it is possible to obtain the same effect as that of the embodiment described above.

What is claimed is:

1. An image reproducing device comprising:
at least one processor programmed to:
acquire images acquired by imaging the surroundings of a vehicle during running of the vehicle with a plurality of cameras, and information on the imaging location of the images;
convert the images into projection images by projecting the images onto a virtual projection plane;
generate a virtual viewpoint image according to a virtual viewpoint on the basis of the plurality of projection images;
control a display device such that the display device displays a map image including a travel history route of the vehicle, a vehicle location mark representing the imaging location on the map image, and a plurality of indexes for selecting a virtual viewpoint direction for a virtual viewpoint image in the vicinity of the vehicle location mark on the map image; and
set a reproduction start position according to a position on the travel history route selected by a first user operation,
wherein if an index is selected by a second user operation, the processor is further programmed to generate a virtual viewpoint image according to a virtual viewpoint direction corresponding to the selected index, as a reproduction image reproduced based on an image that was previously acquired at the reproduction start position.

2. The image reproducing device according to claim 1, wherein:
the at least one processor is further programmed to
generate a plurality of virtual viewpoint images viewed from different virtual viewpoints, and
select the virtual viewpoint image according to the virtual viewpoint direction corresponding to the index selected by the second user operation, as the reproduction image.

3. The image reproducing device according to claim 1, wherein:
the virtual projection plane includes a curved plane.

4. The image reproducing device according to claim 1, wherein:
the at least one processor is further programmed to control the display device such that the display device displays the indexes on the vehicle location mark, and
in the case where an index superimposed on the vehicle location mark is selected by the second user operation, generate virtual viewpoint images according to a virtual viewpoint direction seen from just above the vehicle, as reproduction images.

5. The image reproducing device according to claim 1, wherein:
the at least one processor is further programmed to perform control such that the plurality of indexes is displayed on the reproduction image.

6. The image reproducing device according to claim 1, wherein:
the at least one processor is further programmed to perform control such that indexes corresponding to virtual viewpoint directions seen from the outside of the vehicle and indexes corresponding to virtual viewpoint directions seen from the inside of the vehicle are displayed in the vicinity of the vehicle location mark.

7. The image reproducing device according to claim 1, wherein:
the at least one processor is further programmed to perform control such that indexes corresponding to virtual viewpoint directions seen at a first depression angle and indexes corresponding to virtual viewpoint directions seen at a second depression angle different from the first depression angle are displayed in the vicinity of the vehicle location mark.

8. An image reproducing system comprising:
a recording device configured to record images acquired by imaging the surroundings of a vehicle during running of the vehicle with a plurality of cameras, and information on the imaging locations of the acquired images; and
the image reproducing device according to claim 1 for outputting reproduction images based on the images recorded by the recording device.

9. An image reproducing method comprising:
an acquiring step of acquiring images acquired by imaging the surroundings of a vehicle during running of the vehicle with a plurality of cameras, and information on the imaging location of the images;
a converting step of converting the images into projection images by projecting the images onto a virtual projection plane;
a generating step of generating a virtual viewpoint image according to a virtual viewpoint on the basis of the plurality of projection images;
a display control step of controlling a display device such that the display device displays a map image including a travel history route of the vehicle, a vehicle location mark representing the imaging location on the map image, and a plurality of indexes for selecting a virtual viewpoint direction for a virtual viewpoint image in the vicinity of the vehicle location mark on the map image; and
a setting step of setting a reproduction start position according to a position on the travel history route selected by a first user operation, wherein if an index is selected by a second user operation, the generating step generates a virtual viewpoint image according to a virtual viewpoint direction corresponding to the selected index, as a reproduction image reproduced based on an image that was previously acquired at the reproduction start position.

10. The image reproducing method according to claim 9, further comprising:
   generating a plurality of virtual viewpoint images viewed from different virtual viewpoints; and
   selecting the virtual viewpoint image according to the virtual viewpoint direction corresponding to the index selected by the second user operation, as the reproduction image.

* * * * *